United States Patent
Reichelt et al.

(10) Patent No.: US 6,797,778 B2
(45) Date of Patent: Sep. 28, 2004

(54) USE OF MODIFIED OLEFIN POLYMERS FOR PRODUCING POLYOLEFIN PRODUCTS WITH IMPROVED TOUGHNESS, STRENGTH AND HEAT RESISTANCE

(75) Inventors: Norbert Reichelt, Neuhofen (AT); Manfred Raetzsch, Wilhering/Thalheim (AT); Gerald Rohaczek, Schwechat-Rannersdorf (AT)

(73) Assignee: Borealis GmbH, Schwechat-Mannswoerth (AU)

( * ) Notice: Subject to any disclaimer, the term of this patent is extended or adjusted under 35 U.S.C. 154(b) by 0 days.

(21) Appl. No.: 10/312,472

(22) PCT Filed: Jun. 18, 2001

(86) PCT No.: PCT/EP01/06842
§ 371 (c)(1),
(2), (4) Date: Jan. 23, 2003

(87) PCT Pub. No.: WO01/98385
PCT Pub. Date: Dec. 27, 2001

(65) Prior Publication Data
US 2003/0176590 A1 Sep. 18, 2003

(30) Foreign Application Priority Data
Jun. 23, 2000 (EP) .............................................. 00113359

(51) Int. Cl.$^7$ .............................. C08F 8/00; C08L 9/00; C08L 23/00; C08L 23/04; C08L 25/02
(52) U.S. Cl. ........................ 525/191; 525/192; 525/194; 525/232; 525/240; 525/241
(58) Field of Search ................................. 525/191, 192, 525/194, 232, 240, 241

(56) References Cited

U.S. PATENT DOCUMENTS

| | | | |
|---|---|---|---|
| 4,459,380 A | * | 7/1984 | Vostovich .................... 524/94 |
| 5,459,201 A | | 10/1995 | Shroff et al. |
| 5,525,675 A | * | 6/1996 | Masuda et al. ............. 525/194 |
| 6,204,348 B1 | | 3/2001 | Raetzsch et al. |
| 6,310,140 B1 | * | 10/2001 | Raetzsch et al. ............ 525/191 |

FOREIGN PATENT DOCUMENTS

| | | |
|---|---|---|
| DE | 19720973 | 11/1998 |
| EP | 0680980 | 11/1995 |
| EP | 0792894 | 9/1997 |
| EP | 0874009 | 10/1998 |
| EP | 0942020 | 9/1999 |

OTHER PUBLICATIONS

Martucelli, E., Polymer 24 (1983), 1458.
Thomas, S., Kautschuk–Gummi–Kunststoffe (Rubbers and Plastics) 40 (1987), 665–671.
EPR [Greco, R., Polymer 28 (1987), 1929–1936].
EPDM [Karger–Kocsis, J., Polymer 23 (1982), 699–705].
Yu, T., SPE–ANTEC'94, 2439–2442, (1994).
Gisbergen, J., Polymer 30 (1989) 12, 2153–2157.
Lee, N., "Plastic blow molding handbook", Van Norstrand Reinhold Publ. New York 1990; Rosato, D., "Blow molding handbook", Carl–Hanser–Verlag Munich 1989.

* cited by examiner

Primary Examiner—Nathan M. Nutter
(74) Attorney, Agent, or Firm—Jordan and Hamburg LLP

(57) ABSTRACT

Use of modified olefin polymers for production of polyolefin products with improved toughness, strength and heat resistance. Polyolefin products with high requirements for toughness, strength and heat resistance, produced from modified olefin polymers based on modified propylene polymers which have been modified by reaction with bifunctional monomers in the presence of free-radical generators in the solid phase. The polyolefin products are particularly suitable for shock-absorbing components of motor vehicles, such as bumpers, spoilers and side edge protection elements.

19 Claims, No Drawings

USE OF MODIFIED OLEFIN POLYMERS FOR PRODUCING POLYOLEFIN PRODUCTS WITH IMPROVED TOUGHNESS, STRENGTH AND HEAT RESISTANCE

The invention relates to the use of modified olefin polymers based on modified propylene polymers for producing polyolefin products with simultaneously high requirements for toughness and strength and heat resistance.

Polyolefin products based on propylene polymers with good toughness properties are known.

The toughness of products made of propylene polymers can be improved by using polypropylene blends which comprise elastomers, such as polyisobutylene (Martucelli, E., Polymer 24(1983), 1458), ethylene-vinyl acetate copolymers [Thomas, S., Kautschuk-Gummi-Kunststoffe (Rubbers and Plastics) 40(1987), 665–671 EPR [Greco, R., Polymer 28(1987), 1929–1936], EPDM [Karger-Kocsis, J., Polymer 23(1982), 699–705] or copolymers made of ethylene and of higher α-olefins [Yu, T., SPE-ANTEC'94, 2439–2442]. The disadvantage of these melt blends is a loss of strength and heat resistance with increasing elastomer content.

It is known to improve the strength and heat resistance in PP/EPDM blends by irradiation with electrons [Gisbergen, J., Polymer 30(1989)12, 2153–2157] or in PP/EVA blends [Thomas, S., Kautschuk-Gummi-Kunststoffe 40(1987), 665–671] and, respectively, in blends made of polypropylene and ethylene-propylene rubber (U.S. Pat. No. 5,459,201) by kneading in the presence of peroxides.

It is also known to react ethylene polymers, propylene polymers, such as propylene homopolymers or elastomeric propylene-ethylene copolymers or mixtures of these, with bifunctionally ethylenically unsaturated compounds, such as isoprene, in the presence of peroxides in the melt (EP-A1-0 874 009).

Impact-modified blends made of polypropylene, of propylene copolymers with ethylene and/or of higher α-olefins and of elastomeric copolymers made of ethylene and propylene and/or of higher α-olefins, which are prepared by multistage polymerization, are also known (EP-A1-0 680 980; EP-A1-0 942 020).

Polyolefin products with simultaneously high requirements for toughness and strength and heat resistance have until now required the addition of large amounts of additives (e.g. 10% by weight of talc as filler or reinforcing material) to establish the required mechanical properties.

The object of the present invention is to provide polyolefin products which satisfy the requirement profile described above and do so using, in order to establish the required mechanical properties, an amount of additives reduced compared with that used in the prior art.

According to the invention, this object is then achieved by using modified olefin polymers based on modified propylene polymers which olefin polymers have melt indices of from 8 to 100 g/10 min at 230° C./2.16 kp and are obtainable by activating a polyolefin composition comprising X % by weight of a semicrystalline propylene homopolymer and/or of a semicrystalline copolymer made of from 88 to 99.5% by weight of propylene and from 12 to 0.5% by weight of ethylene and/or an α-olefin of the general formula $CH_2=CHR$, where R is a linear or branched alkyl radical having from 2 to 8 carbon atoms, (100-X) % by weight of an elastic copolymer made of from 20 to 70% by weight of ethylene and from 80 to 30% by weight of propylene and/or an α-olefin of the general formula $CH_2=CHR_1$, where $R_1$ is a linear or branched alkyl radical having from 2 to 8 carbon atoms, at elevated temperature with peroxides and reacting the activated polyolefin composition with 0.1 to 10% by weight, based on the polyolefin composition, of volatile bifunctional monomers, for the production of polyolefin products with simultaneously high requirements for toughness and strength and heat resistance and having the following combinations of properties $KM_1$, $KR_1$, $ZM_1$, $WF_1$ or
$KM_2$, $KR_2$, $ZM_2$, $WF_2$ or
$KM_3$, $KR_3$, $ZM_3$, $WF_3$ where
$KM_1 \geq 50$, $KR_1 \geq 50$, $ZM_1 \geq 350$, $WF_1 \geq 120$ and
$KM_2 \geq 25$, $KR_2 \geq 40$, $ZM_2 \geq 700$, $WF_2 \geq 135$ and
$KM_3 \geq 10$, $KR_3 \geq 30$, $ZM_3 \geq 1000$, $WF_3 \geq 145$ and where KM is Charpy impact strength at −20° C. (kJ/m$^2$) to DIN 53453

KR is Charpy impact strength at +23° C. (kJ/m$^2$) to DIN 53453

ZM is tensile modulus at 23° C. (MPa) to DIN 53457/ISO 527

WF is Vicat A softening point (° C.) to ISO 306, and where X takes the values $X_1$=from 60 to 70 for the combination of properties $KM_1$, $KR_1$, $ZM_1$, $WF_1$;

$X_2$=from 70 to 78 for the combination of properties $KM_2$, $KR_2$, $ZM_2$, $WF_2$, $X_3$ from 78 to 85 for the combination of properties $KM_3$, $KR_3$, $ZM_3$, $WF_3$.

Surprisingly, it has been found that mixtures made of semicrystalline propylene polymers and of elastomeric ethylene copolymers in defined mixing ratios, which have been modified by reacting with bifunctional monomers in the presence of free-radical generators, are suitable for the polyolefin products with high requirements for toughness, strength and heat resistance.

In this specification the terms "bifunctional monomers" and "bifunctionally unsaturated monomers" have the same meaning, i.e. monomers having (at least) two double bonds.

The novel polyolefin products are preferably produced using modified olefin polymers prepared by a) mixing the polyolefin composition, which is in a particulate shape, with from 0.05 to 3% by weight, based on the polyolefin composition used, of acyl peroxides, alkyl peroxides, hydroperoxides, peresters and/or peroxycarbonates as free-radical generators capable of thermal decomposition, if desired diluted with inert solvents, with heating to 30–100° C., b) sorption of volatile bifunctional monomers by the particulate polyolefin composition from the gas phase at a temperature T(° C.) of from 20 to 120° C., where the amount of the bifunctionally unsaturated monomers is from 0.01 to 10% by weight, based on the polyolefin composition used, and then c) heating and melting the particulate polyolefin composition in an atmosphere comprising inert gas and/or the volatile bifunctional monomers, and from 110 to 210° C., whereupon the free-radical generators capable of thermal decomposition are decomposed and then d) heating the melt to 220–250° C. in order to remove unreacted monomers and decomposition products, e) pelletizing the melt in a manner known per se.

In another advantageous embodiment, the novel polyolefin products are produced from mixtures made of from 85 to 99% by weight of a modified olefin polymer with a melt index of from 8 to 100 g/10 min at 230° C./2.16 kp and from 1 to 15% by weight of an unmodified propylene polymer with a melt index of from 0.5 to 100 g/10 min at 230° C./2.16 kp.

It is preferable here for the unmodified propylene polymers to be formed from propylene homopolymers, from copolymers made of propylene with α-olefins having from 2 to 18 carbon atoms, preferably from random propylene copolymers, from propylene block copolymers, from random propylene block copolymers and/or from elastomeric polypropylenes, or from mixtures of the polypropylenes mentioned.

Particularly suitable propylene homopolymers which may, if desired, be present in the novel polyolefin products are propylene homopolymers with bimodal molar mass distribution, weight-average molar masses $M_w$ of from 500,000 to 1,500,000 g/mol, number-average molar masses $M_n$ of from 25,000 to 100,000 g/mol and $M_w/M_n$ values of from 5 to 60, which were prepared in a reactor cascade using Ziegler-Natta catalysts or metallocene catalysts.

In the preparation of the modified olefin polymers present in the polyolefin products it has proven advantageous to modify polyolefin particles directly emerging from the polymerization plant.

It is preferable for the modified olefin polymers to comprise chemically bonded butadiene, isoprene, dimethylbutadiene, divinylbenzene or mixtures of these as bifunctionally unsaturated monomers.

The average sorption time $\tau_s$ [s] of the volatile bifunctional monomers on the particulate polyolefin composition is advantageously from 10 to 1000 seconds, preferably from 20 to 800 seconds, particularly preferably from 60 to 600 seconds.

It is advantageous moreover for the sorption of the volatile bifunctional monomers by the particulate polyolefin composition to take place from the gas phase during the preparation of the modified olefin polymers at a temperature T(° C.) of from 70 to 90° C.

The sorbed amount of the bifunctionally unsaturated monomers in the modified olefin polymers is preferably from 0.05 to 2% by weight, based on the polyolefin composition used.

The novel polyolefin products are preferably produced by thermoplastic shaping, in particular by extrusion, injection moulding, blow moulding or thermoforming. Usual processing temperatures for the polyolefin products produced by extrusion, injection moulding or blow moulding are ranges of temperature from 170 to 300° C.

Known production processes for blow-moulded polyolefin mouldings are extrusion blow moulding, extrusion stretch blow moulding, injection blow moulding and injection stretch blow moulding (Lee, N., "Plastic blow molding handbook", Van Norstrand Reinhold Publ. New York 1990; Rosato, D., "Blow molding handbook", Carl-Hanser-Verlag Munich 1989).

The injection rate during production of the injection-moulded polyolefin products should be set as high as possible, so that the polyolefin products do not have sink marks or bad flow lines.

In producing the polyolefin products it is preferable to use injection moulding machines with injection units which have three-zone screws with a screw length of from 18 to 24 D.

The polyolefin products which have been produced by extrusion, injection moulding, blow moulding or thermoforming are suitable for use in the packaging industry, in the household equipment industry, in products required in laboratories or in hospitals, in equipment for gardens or agriculture, for transport containers, and also for components in the automotive industry, components of machines and electrical or electronic equipment.

Examples of blow-moulded polyolefin products are bottles, small containers, containers for liquids, liquid-feed parts, air-supply system parts, internal containers, tanks, shock-absorbing components for the automotive industry, folding bellows, protective covers, housings, tubular components, pipes and/or carrying cases.

Examples of injection-moulded polyolefin products are components in the automotive industry, packaging, transport containers, components of machines, of household equipment and of electrical or electronic equipment.

Particularly preferred polyolefin products are shock-absorbing components of motor vehicles, in particular bumpers, spoilers and side edge protection elements.

The following free-radical generators capable of thermal decomposition may be used during the preparation of the modified olefin polymers present in the polyolefin products:

acyl peroxides, such as benzoyl peroxide, 4-chlorobenzoyl peroxide, 3-methoxybenzoyl peroxide and/or methylbenzoyl peroxide;

alkyl peroxides such as allyl tert-butyl peroxide, 2,2-bis(tert-butylperoxybutane), 1,1-bis(tert-butylperoxy)-3,3,5-trimethylcyclohexane, n-butyl 4,4-bis(tert-butylperoxy)valerate, diisopropylaminomethyl tert-amyl peroxide, dimethylaminomethyl tert-amyl peroxide, diethylaminomethyl tert-butyl peroxide, dimethylaminomethyl tert-butyl peroxide, 1,1-di(tert-amylperoxy)cyclohexane, tert-amyl peroxide, tert-butyl cumyl peroxide, tert-butyl peroxide, and/or 1-hydroxybutyl n-butyl peroxide;

peresters and peroxycarbonates, such as butyl peracetate, cumyl peracetate, cumyl perpropionate, cyclohexyl peracetate, di-tert-butyl peradipate, di-tert-butyl perazelate, di-tert-butyl perglutarate, di-tert-butyl perphthalate, di-tert-butyl persebacate, 4-nitrocumyl perpropionate, 1-phenylethyl perbenzoate, phenylethyl nitroperbenzoate, tert-butyl bicyclo[2.2.1]heptanepercarboxylate, tert-butyl 4-carbomethoxyperbutyrate, tert-butyl cyclobutanepercarboxylate, tert-butyl cyclohexylperoxycarboxylate, tert-butyl cyclopentylpercarboxylate, tert-butyl cyclopropanepercarboxylate, tert-butyl dimethylpercinnamate, tert-butyl 2-(2,2-diphenylvinyl)perbenzoate, tert-butyl 4-methoxyperbenzoate, tert-butyl perbenzoate, tert-butyl carboxycyclohexane, tert-butyl pernaphthoate, tert-butylperoxy isopropyl carbonate, tert-butyl pertoluate, tert-butyl 1-phenylcyclopropylpercarboxylate, tert-butyl 2-propylperpenten-2-oate, tert-butyl 1-methylcyclopropylpercarboxylate, tert-butyl 4-nitrophenylperacetate, tert-butyl nitrophenylperoxycarbamate, tert-butyl N-succinimidopercarboxylate, tert-butyl percrotonate, tert-butylpermaleic acid, tert-butyl permethacrylate, tert-butyl peroctoate, tert-butylperoxy isopropyl carbonate, tert-butyl perisobutyrate, tert-butyl peracrylate and/or tert-butyl perpropionate;

and mixtures of these free-radical generators.

Volatile bifunctional monomers which may be used in the preparation of the modified olefin polymers present in the polyolefin products are any bifunctionally unsaturated monomeric compounds which can be sorbed from the gas phase and can be polymerized with the aid of free radicals.

Preference is given to the use of the following bifunctionally unsaturated monomers in amounts of from 0.01 to 10% by weight, based on the polyolefin mixture used:

divinyl compounds, such as divinylaniline, m-divinylbenzene, p-divinylbenzene, divinylpentane and/or divinylpropane;

allyl compounds, such as allyl acrylate, allyl methacrylate, allyl methyl maleate and/or allyl vinyl ether;

dienes, such as butadiene, chloroprene, cyclohexadiene, cyclopentadiene, 2,3-dimethylbutadiene, heptadiene, hexadiene, isoprene and/or 1,4-pentadiene;

and mixture of these unsaturated monomers.

Modified olefin polymers preferably present in the polyolefin products are those in which the bifunctionally unsaturated monomer present is chemically bonded butadiene, isoprene, dimethylbutadiene and/or divinylbenzene.

Continuous gas-solid absorbers used for the sorption of the volatile bifunctional monomers in the preparation of the modified olefin polymers are preferably continuous through-flow mixers.

During the preparation of the modified olefin polymers, the heating and melting of the polyolefin particles within which the bifunctionally unsaturated monomers and the acyl peroxides, alkyl peroxides, hydroperoxides, peresters and/or peroxycarbonates have been sorbed as free-radical generators capable of thermal decomposition takes place in an atmosphere of the volatile bifunctionally unsaturated monomers, preferably in continuous kneaders or extruders, with preference in twin-screw extruders.

The modified olefin polymers and, respectively, the mixtures made of modified olefin polymers and of unmodified propylene polymers may comprise, as additives, from 0.01 to 2.5% by weight of stabilizers and/or from 0.1 to 1% by weight of antistats and/or from 0.2 to 3% by weight of pigments and/or from 0.05 to 1% by weight of nucleating agents and/or from 1 to 40% by weight of fillers and/or reinforcing materials and/or from 2 to 20% by weight of flame retardants and/or from 0.01 to 1% by weight of processing aids, based on the modified olefin polymers and, respectively, the mixtures made of modified olefin polymers and of unmodified propylene polymers.

Stabilizers which may be present in the modified olefin polymers or in the mixtures made of modified olefin polymers and of unmodified propylene polymers are preferably mixtures made of from 0.01 to 0.6% by weight of phenolic antioxidants, from 0.01 to 0.6% by weight of free-arylbenzofuranones, from 0.01 to 0.6% by weight of processing stabilizers based on phosphites, from 0.01 to 0.6% by weight of high-temperature stabilizers based on disulphides and on thioethers and/or from 0.01 to 0.8% by weight of sterically hindered amines (HALS).

Suitable phenolic antioxidants are 2-tert-butyl-4,6-dimethylphenol, 2,6-di-tert-butyl-4-methylphenol, 2,6-di-tert-butyl-4-isoamylphenol, 2,6-di-tert-butyl-4-ethylphenol, 2-tert-butyl-4,6-diisopropylphenol, 2,6-dicyclopentyl-4-methylphenol, 2,6-di-tert-butyl-4-methoxymethylphenol, 2-tert-butyl-4,6-dioctadecylphenol, 2,5-di-tert-butylhydroquinone, 2,6-di-tert-butyl-4-dihexadecyloxyphenol, 2,2'-methylenebis(6-tert-butyl-4-methylphenol), 4,4'-thiobis(6-tert-butyl-2-methylphenol), octadecyl 3-(3,5-di-tert-butyl-4-hydroxyphenyl)propionate, 1,3,5-trimethyl-2,4,6-tris(3',5'-di-tert-butyl-4-hydorxybenzyl)benzene and/or pentaerythritol tetrakis[3-(3,5-di-tert-butyl-4-hydroxyphenyl)]propionate.

A particularly suitable benzofuranone derivative is 5,7-di-tert-butyl-3-(3,4-dimethylphenyl)-3H-benzofuran-2-one.

Particularly suitable HALS compounds are bis-2,2,6,6-tetramethyl-4-piperidyl sebacate and/or poly((6-((1,1,3,3-tetramethylbutyl)amino)-1,3,5-triazine-2,4-diyl)(2, 2,6,6-tetramethyl-4-piperidyl)imino)-1,6-hexanediyl((2,2,6,6-tetramethyl-4-piperidyl)imino))-.

Nucleating agents which may be present in the modified olefin polymers or in the mixtures made of modified olefin polymers and of unmodified propylene polymers are α-nucleating agents, such as talc or sodium methylenebis (2,4-di-tert-butylphenyl)phosphate or β-nucleating agents, such as the dianilide of adipic acid or dibenzoquinacridone or N,N'-dicyclohexyl-2,6-naphthalenedicarboxamide.

The fillers which may, if desired, be present in the modified olefin polymers or mixtures made of modified olefin polymers and of unmodified propylene polymers are preferably $Al_2O_3$, $Al(OH)_3$, barium sulphate, calcium carbonate, glass beads, wood flour, siliceous earth, hollow microbeads, carbon black, talc and/or wollastonite.

The reinforcers which may, if desired, be present in the modified olefin polymers or mixtures made of modified olefin polymers and of unmodified propylene polymers are preferably aramid fibres, cellulose fibres, flax, jute, kenaf, glass fibres, microfibres made of liquid-crystalline polymers and/or polytetrafluoroethylene fibres.

Processing aids which may be present in the modified olefin polymers or in the mixtures made of modified olefin polymers and of unmodified propylene polymers are calcium stearate, magnesium stearate and/or waxes.

The novel polyolefin products preferably have gel contents of from 0.5 to 20% by weight.

EXAMPLES

The examples below illustrate the invention:

Example 1

Preparation of the Modified Olefin Polymer

A pulverulent polyolefin mixture (melt index 13 g/10 min at 230° C./2.16 kp, average particle diameter 0.55 mm) made of 73% by weight of a propylene homopolymer (melt index 28 g/10 min at 230° C./2.16 kp) and 27% by weight of an ethylene-propylene copolymer (ethylene content 14.3% by weight) is metered continuously into a continuous heatable through-flow mixer. 0.1% by weight of calcium stearate and 0.09% by weight of bis(tert-butylperoxy)-2,5-dimethylhexane, based in each case on the polyolefin mixture, are then metered continuously into the through-flow mixer. With thorough and homogeneous mixing at 45° C., the polyolefin mixture, loaded with free-radical generator capable of thermal decomposition and with auxiliary, is loaded by sorption with 0.92% by weight of divinylbenzene, based on the polyolefin mixture, using a divinylbenzene-nitrogen mixture with a residence time of 6 min at 82° C. The pulverulent reaction mixture is transferred to a Berstorff twin-screw extruder (temperature profile 25/160/160/160/165/160/190/220/220/230° C., throughput 5.8 kg/h) and, in contact with the divinylbenzene-nitrogen mixture metered in, and with addition of 0.1% by weight of tetrakis [methylene (3,5-di-tert-butylhydroxyhydrocinnamate)] methane and 0.1% by weight of tris(2,4-di-tert-butylphenyl) phosphite, heated and melted, subjected to preliminary devolatilization with water metered in as entrainer and then to intensive devolatilization, discharged and pelletized.

The resultant modified olefin polymer has a content of bonded divinylbenzene of 0.7% by weight, determined by IR spectroscopy, and a melt index of 14.2 g/10 min at 230° C./2.16 kp.

Production of Injection Mouldings from the Modified Olefin Polymer

The pellets prepared are processed in a Ferromatic Millacron FM 60 injection moulding machine which has a three-zone screw with a screw length of 22 D, at a melt temperature of 225° C. and with a mould temperature of 50° C., according to DIN 16774, to give standard injection-moulded test specimens.

The Following Properties Were Determined on the Standard Injection-moulded Test Specimens Charpy impact strength at −20° C. to DIN 53453: 38 kJ/m$^2$
Charpy impact strength at +23° C. to DIN 53453: 57 kJ/m$^2$
Tensile modulus at 23° C. to DIN 53457/ISO 527: 800 MPa
Vicat A softening point (° C.) to ISO 306: 138° C.

Example 2

Preparation of the Modified Olefin Polymer

A pulverulent polyolefin mixture (melt index 0.5 g/10 min at 230° C./2.16 kp, average particle diameter 0.26 mm) made of 75% by weight of a propylene-ethylene copolymer (melt index 0.45 g/10 min at 230° C./2.16 kp, ethylene content 5.5% by weight) and 25% by weight of an ethylene-propylene copolymer (ethylene content 12.5% by weight) is metered continuously into a continuous heatable through-flow mixer. 0.1% by weight of magnesium stearate and 0.25% by weight of tert-butyl peroxyisopropyl carbonate, based in each case on the polyolefin mixture, are then metered continuously into the through-flow mixer. With thorough and homogeneous mixing at 52° C., the polyolefin mixture, loaded with free-radical generator capable of thermal decomposition and with auxiliary, is loaded by sorption with 0.3% by weight of isoprene, based on the polyolefin mixture, using a isoprene-nitrogen mixture with a residence time of 5 min at 76° C. The pulverulent reaction mixture is transferred to a Berstorff twin-screw extruder (temperature profile 25/150/155/160/160/160/185/215/220/220° C., throughput 5.2 kg/h) and, in contact with the isoprene-nitrogen mixture metered in, and with addition of 0.1% by weight of 2,2'-methylenebis(6-tert-butyl4-methylphenol) and 0.1% by weight of 5,7-di-tert-butyl-3-(3,4-dimethylphenyl)3H-benzofuran-2-one, heated and melted, subjected to preliminary devolatilization with water metered in as entrainer and then to intensive devolatilization, discharged and pelletized.

The resultant modified olefin polymer has a content of 0.22% by weight of bonded isoprene, determined by IR spectroscopy, and a melt index of 8.2 g/10 min at 230° C./2.16 kp.

A compound made of 90% by weight of the modified olefin polymer and 10% by weight of an unmodified propylene homopolymer (melt index 28 g/10 min at 230° C./2.16 kp) is extruded through a Brabender laboratory extruder with slot die (temperature profile 85/150/185/220/220/220° C.) to give a rectangular 40×4 mm profile.

Stamped-out Test Specimens have the Following Properties
Charpy impact strength at −20° C. to DIN 53453: 28 kJ/m$^2$
Charpy impact strength at +23° C. to DIN 53453: 48 kJ/m$^2$
Tensile modulus at 23° C. to DIN 53457/ISO 527: 710 MPa
Vicat A softening point (° C) to ISO 306: 136° C.

Example 3

Preparation of the Modified Olefin Polymer

A pulverulent polyolefin mixture (melt index 6 g/10 min at 230° C./2.16 kp, average particle diameter 0.32 mm) made of 65% by weight of a propylene copolymer (melt index 17 g/10 min at 230° C./2.16 kp) and 35% by weight of an ethylene-propylene copolymer (ethylene content 18.2% by weight) is metered continuously into a continuous heatable through-flow mixer. 0.1% by weight of montan wax and 0.18% by weight of methyl benzoyl peroxide, based in each case on the polyolefin mixture, are also metered continuously into the through-flow mixer. With thorough and homogeneous mixing at 45° C., the polyolefin mixture, loaded with free-radical generator capable of thermal decomposition and with auxiliary, is loaded by sorption with 0.45% by weight of butadiene, based on the polyolefin mixture, using a butadiene-nitrogen mixture with a residence time of 4 min at 88° C. The pulverulent reaction mixture is transferred to a Berstorff twin-screw extruder (temperature profile 25/150/160/160/165/170/190/220/220/230° C., throughput 6.2 kg/h) and, in contact with the butadiene-nitrogen mixture metered in, and with addition of 0.1% by weight of 2-tert-butyl-4,6-dioctadecylphenol and 0.1% by weight of tris(2,4-di-tert-butylphenyl) phosphite, heated and melted, subjected to preliminary devolatilization with water metered in as entrainer and then to intensive devolatilization, discharged and pelletized.

The resultant modified olefin polymer has a content of bonded butadiene of 0.36% by weight, determined by IR spectroscopy, and a melt index of 14.2 g/10 min at 230° C./2.16 kp.

Production of a Container with a Square Base

The modified olefin polymer (melt index 14.2 g/10 min at 230° C./2.16 kp) is melted using the temperature profile 100/160/205/215/215° C. in the plastifying unit of an injection stretch blow moulding machine comprising plastifying unit with three-zone screw, rotary table with cooled 4-fold injection mould, conditioning mould with three heating zones, blow mould with stretching ram and ejection apparatus, and injected into the 4-fold injection mould, temperature-controlled to 120° C. The parison (31 g, wall thickness from 4.5 to 5.5 mm, height 88 mm) is removed from the injection mould by way of the mandrel of the rotary table and introduced into the electrically heated conditioning mould by way of a 90° tipping movement of the rotary table, the heating zones of the conditioning mould having been set at 135° C. (parison base), 138° C. (parison central section) and 135° C. (parison upper section). After a conditioning time of 80 s compressed air is used for preblowing, the blow-moulded premoulding is removed and transferred, by way of the mandrel of the rotary table and the 90° tipping movement of the rotary table, into the blow mould, where the blow-moulded premoulding is then subjected to longitudinal stretching by way of the stretching ram and then shaped using compressed air at a pressure of 20 bar. The longitudinal stretching ratio for the premoulding in the blow mould is 2.8:1 and the transverse stretching ratio for the premoulding is 2.0:1. The blow-moulded container is removed from the opened blow mould after 7.5 s, fed to the ejector by way of a 90° tipping movement of the rotary table, and ejected.

Test Specimens Stamped out from the Sides of the Container have the Following Properties Charpy impact strength at −20° C. to DIN 53453: 67 kJ/m$^2$
Charpy impact strength at +23° C. to DIN 53453: 74 kJ/m$^2$
Tensile modulus at 23° C. to DIN 53457/ISO 527: 550 MPa
Vicat A softening point (° C.) to ISO 306: 125° C.

Example 4

Preparation of the Modified Olefin Polymer

A pulverulent polyolefin mixture (melt index 8.5 g/10 min at 230° C./2.16 kp, average particle diameter 0.28 mm) made of 82% by weight of a propylene-ethylene copolymer (melt index 14 g/10 min at 230° C./2.16 kp, ethylene content 8.2% by weight) and 18% by weight of an ethylene-propylene copolymer (ethylene content 28.5% by weight) is metered continuously into a continuous heatable through-flow mixer. 0.15% by weight of calcium stearate and 0.35% by weight of tert-butyl cyclopentylpercarboxylate, based in each case on the polyolefin mixture, are then metered continuously into the through-flow mixer. With thorough and homogeneous mixing at 50° C., the polyolefin mixture, loaded with free-radical generator capable of thermal decomposition and with auxiliary, is loaded by sorption with 0.82% by weight of dimethylbutadiene, based on the polyolefin mixture, using a dimethylbutadiene-nitrogen mixture with a residence time of 5.5 min at 72° C. The pulverulent reaction mixture is transferred to a Berstorff twin-screw extruder (temperature profile 25/160/160/160/165/160/190/220/220/230° C., throughput 5.4 kg/h) and, in contact with the dimethylbutadiene-nitrogen mixture metered in, and with addition of 0.15% by weight of 4,4'-thiobis(6-tert-butyl-2-methylphenol) and 0.1% by weight of sodium methylenebis(2,4-di-tert-butylphenol) phosphate, heated and melted, subjected to preliminary devolatilization with water metered in as entrainer and then to intensive devolatilization, discharged and pelletized.

The resultant modified olefin polymer has a content of bonded dimethylbutadiene of 0.70% by weight, determined by IR spectroscopy, and a melt index of 8.2 g/10 min at 230° C./2.16 kp.

Production of Injection Mouldings from the Modified Olefin Polymers

The pellets produced are processed in a Ferromatic Millacron FM 60 injection moulding machine which has a three-zone screw with a screw length of 22 D, at a melt temperature of 225° C. and at a mould temperature of 50° C., in accordance with DIN 16774, to give standard injection moulded test specimens.

The Following Properties Were Determined on the Standard Injection Moulded Test Specimens Charpy impact strength at −20° C. to DIN 53453: 12 kJ/m$^2$
Charpy impact strength at +23° C. to DIN 53453: 34 kJ/m$^2$
Tensile modulus at 23° C. to DIN 53457/ISO 527: 1120 MPa
Vicat A softening point (° C.) to ISO 306: 147° C.

What is claimed is:

1. A method of producing modified olefin polymers based on modified propylene polymers which olefin polymers have melt indices of from 8 to 100 g/10 min at 230° C./2.16 kp, the modified olefin polymers being shapeable into polyolefin products which simultaneously are of high toughness, high strength and high heat resistance, preparing and comprising activating a polyolefin composition which comprises X % by weight of a semicrystalline propylene homopolymer and/or of a semicrystalline copolymer made of from 88 to 99.5% by weight of propylene and from 12 to 0.5% by weight of ethylene and/or an α-olefin of the general formula $CH_2=CHR$, where R is a linear or branched alkyl radical having from 2 to 8 carbon atoms, and (100-X) % by weight of an elastic copolymer made of from 20 to 70% by weight of ethylene and from 80 to 30% by weight of propylene and/or an α-olefin of the general formula $CH_2=CHR_1$, where $R_1$ is a linear or branched alkyl radical having from 2 to 8 carbon atoms, at elevated temperature with peroxides and reacting the activated polyolefin composition with 0.1 to 10% by weight, based on the polyolefin composition, of volatile bifunctional monomers, the high toughness, strength and heat resistance being defined by the following combinations of properties
$KM_1$, $KR_1$, $ZM_1$, $WF_1$, or
$KM_2$, $KR_2$, $ZM_2$, $WF_2$ or
$KM_3$, $KR_3$, $ZM_3$, $WF_3$ where $KM_1$, >50, $KR_1$>50, $ZM_1$, >350, $WF_1$>120 and
$KM_2$>25, $KR_2$>40, $ZM_2$>700, $WF_2$>135 and
$KM_3$>10, $KR_3$>30, $ZM_3$>1000, $WF_3$>145 and where KM is Charpy impact strength at −20° C. (kJ/m$^2$) to DIN 53453

KR is Charpy impact strength at +23° C. (kJ/m2) to DIN 53453

ZM is tensile modulus at 23° C. (MPa) to DIN 53457/ISO 527

WF is Vicat A softening point (° C.) to ISO 308,
and where X takes the values $X_1$=from 60 to 70 for the combination of properties $KM_1$, $KR_1$, $ZM_1$, $WF_1$;

$X_2$=from 70 to 78 for the combination of properties $KM_2$, $KR_2$, $ZM_2$, $WF_2$;

$X_3$=from 78 to 85 for the combination of properties $KM_3$, $KR_3$, $ZM_3$, $WF_3$.

2. Method according to claim 1, wherein the preparing and activating of the polyolefin composition comprises a) mixing the polyolefin composition, which is in a particulate shape, with from 0.05 to 3% by weight, based on the polyolefin composition, of acyl peroxides, alkyl peroxides, hydroperoxides, peresters and/or peroxycarbonates as free-radical generators capable of thermal decomposition, optionally diluted with inert solvents, with heating to 30–100° C., b) sorption of volatile bifunctional monomers by the particulate polyolefin composition from gas phase at a temperature (° C.) of from 20 to 120° C., where the amount of the bifunctionally unsaturated monomers is from 0.01 to 10% by weight, based on the polyolefin composition, and then c) heating and melting the particulate polyolefin composition in an atmosphere comprising inert gas and/or the bifunctional monomers which have volatilized, and from 110 to 210° C., whereupon the free-radical generators capable of thermal decomposition are decomposed and the method further comprises then d) heating the melt to 220–250° C. in order to remove unreacted monomers and decomposition products, and f) forming the melt into pellets.

3. Method according to claim 1 or 2 wherein the polyolefin composition comprises a mixture of from 85 to 99% by weight of a modified olefin polymer with a melt index of from 8 to 100 g/10 min at 230° C./2.16 kp and from 1 to 15% by weight of an unmodified propylene polymer with a melt index of from 0.5 to 100 g/10 min at 230° C./2.16 kp.

4. Method according to claim 3, wherein the unmodified propylene polymers are formed from propylene homopolymers, from copolymers made of propylene with α-olefins having from 2 to 18 carbon atoms, from random propylene copolymers, from propylene block copolymers, from random propylene block copolymers and/or from elastomeric polypropylenes, or from mixtures of the foregoing.

5. Method according to any claim 1 or 2 wherein the modified olefin polymers comprise chemically bonded butadiene, isoprene, dimethylbutadiene, divinylbenzene or mixtures of these as bifunctionally unsaturated monomers.

6. Use according to any one of claim 2 wherein the average time of said sorption is from 10 to 1000 seconds.

7. Method according to claim 2 wherein said temperature during the sorption is from 70 to 90° C.

8. Method according to claim 3 wherein the amount of the bifunctional monomers sorbed in the modified olefin polymers is from 0.05 to 2% by weight, based on the polyolefin composition.

9. Polyolefin pellets produced by the method of claim 1 or 2.

10. Method of producing polyolefin articles comprising thermoplastically shaping a molten mass of the pellets of claim 9 into said articles.

11. Polyolefin articles according to claim 9 having gel contents of from 0.5 to 20% by weight.

12. Polyolefin articles produced by the method of claim 10.

13. Polyolefin articles according to claim 12, comprising shock-absorbing components of motor vehicles.

14. Products produced by the method of claim 1.

15. Method according to claim 4 wherein the unmodified propylene polymers are formed from random propylene copolymers.

16. Method according to claim 6 wherein said sorption time is from 20 to 800 seconds.

17. Method according to claim 6 wherein said sorption time is from 60 to 600 seconds.

18. Method according to claim 10 wherein said thermoplastic shaping comprises extrusion, injection molding, blow molding or thermoforming.

19. Polyolefin articles according to claim 13 comprising bumpers, spoilers and side edge protection elements.

* * * * *